Figure 6:
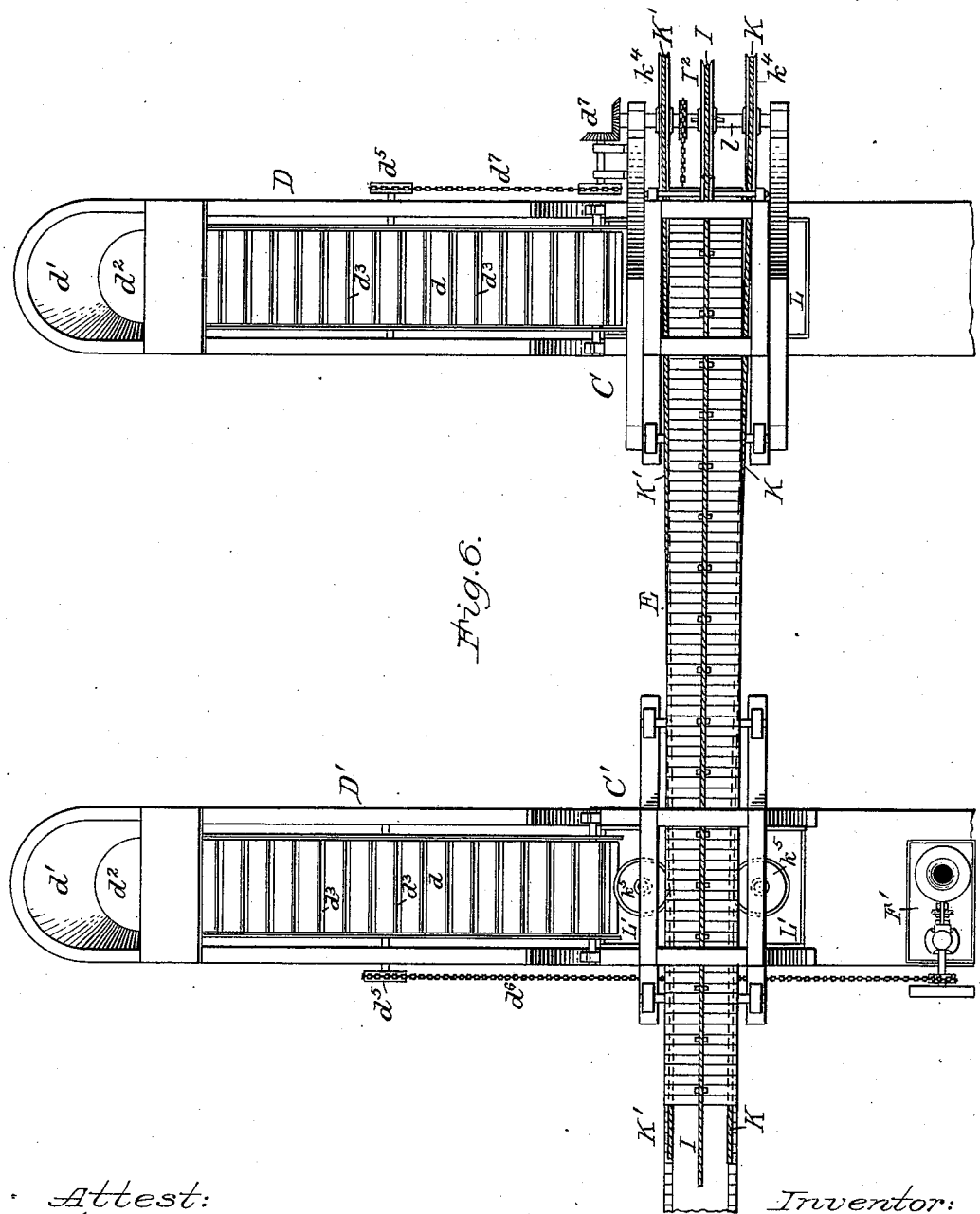

(No Model.) 7 Sheets—Sheet 1.
H. C. LOWRIE.
APPARATUS FOR EXCAVATING, REMOVING, AND DEPOSITING EARTHY MATTER.
No. 565,549. Patented Aug. 11, 1896.
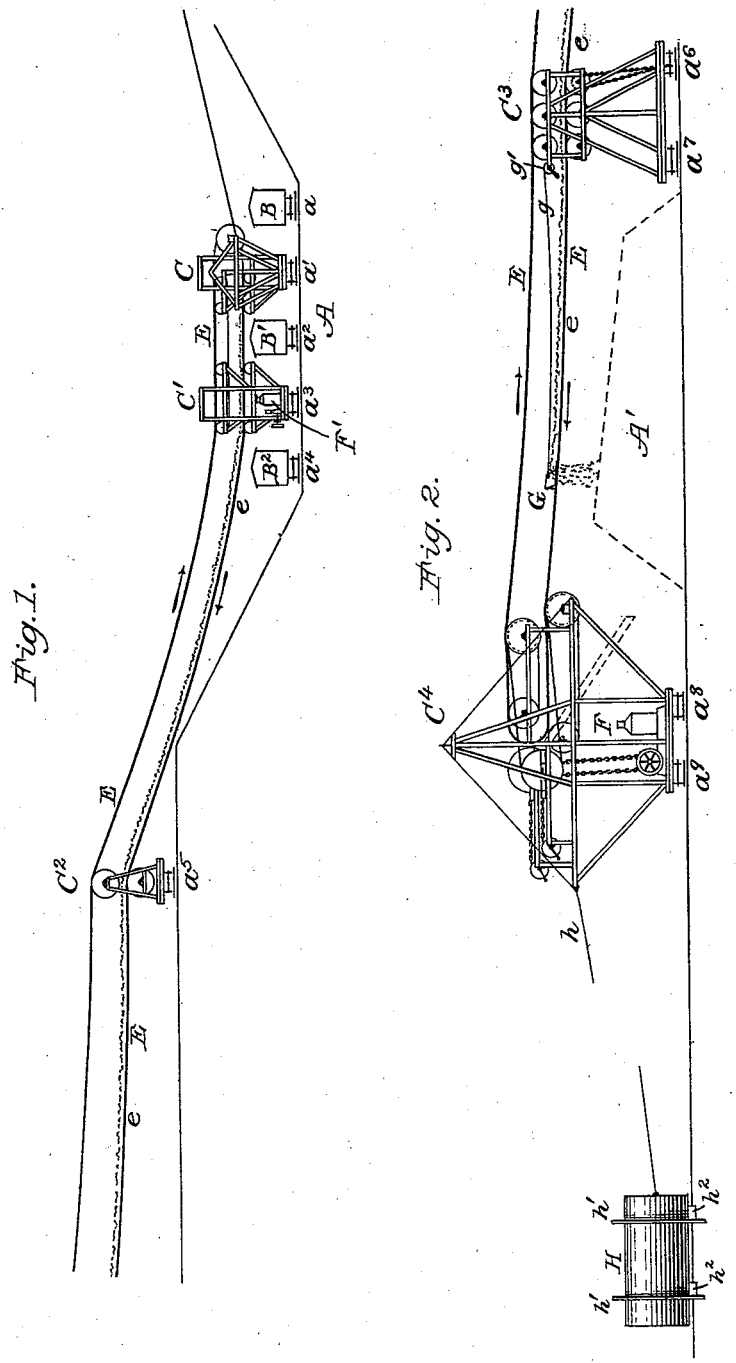

(No Model.) 7 Sheets—Sheet 2.
H. C. LOWRIE.
APPARATUS FOR EXCAVATING, REMOVING, AND DEPOSITING EARTHY MATTER.
No. 565,549. Patented Aug. 11, 1896.
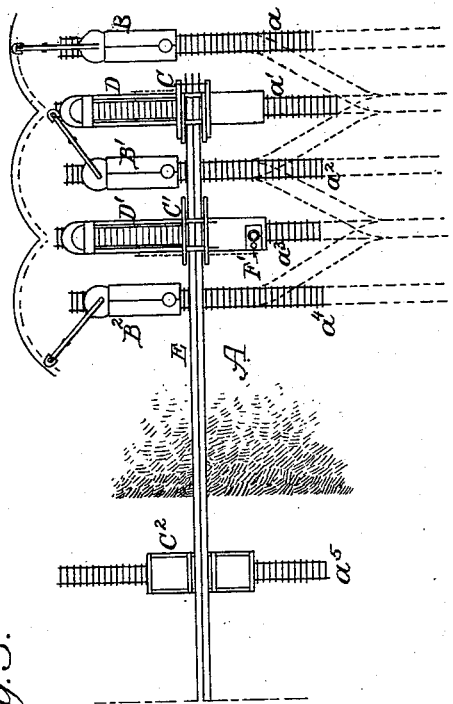
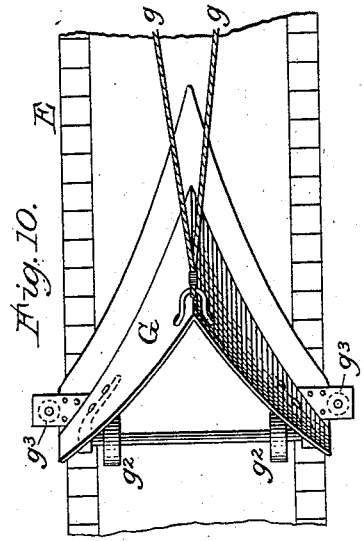
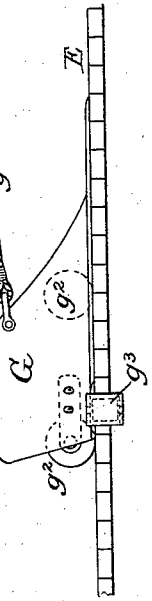
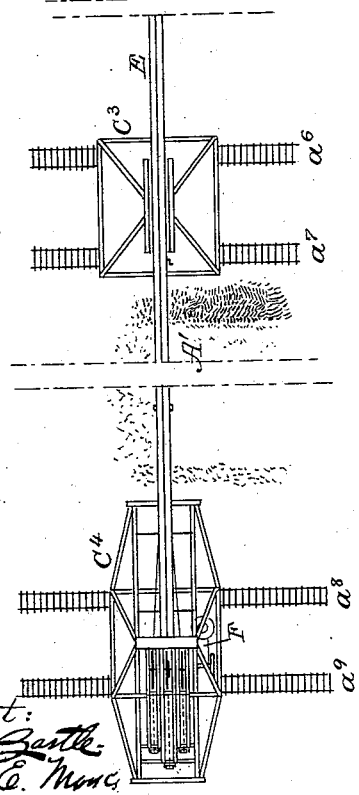
Inventor:
Harvey C. Lowrie (No Model.) 7 Sheets—Sheet 3.
H. C. LOWRIE.
APPARATUS FOR EXCAVATING, REMOVING, AND DEPOSITING EARTHY MATTER.
No. 565,549. Patented Aug. 11, 1896.
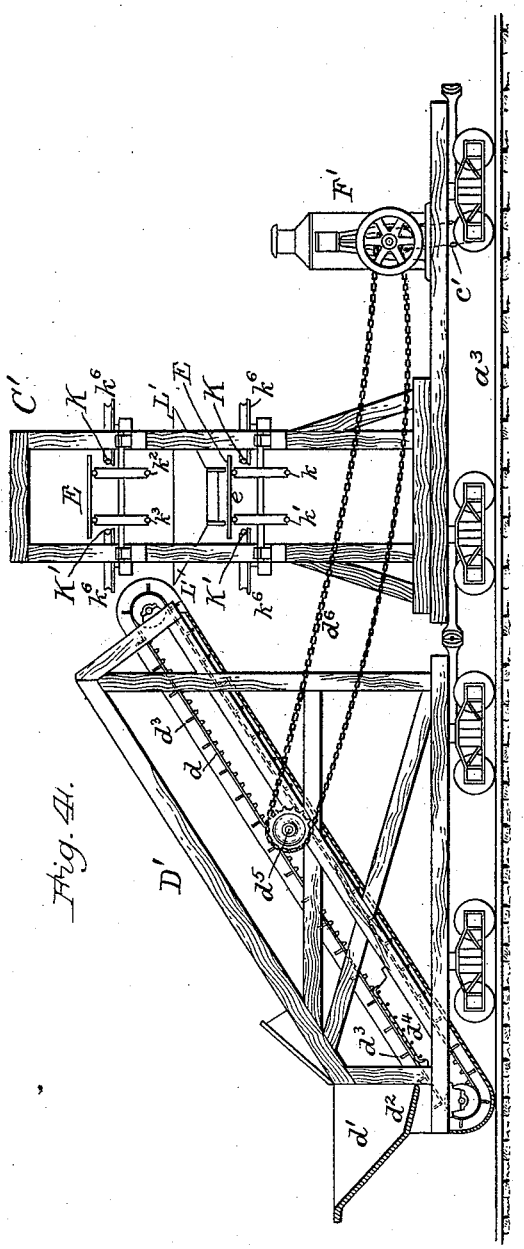
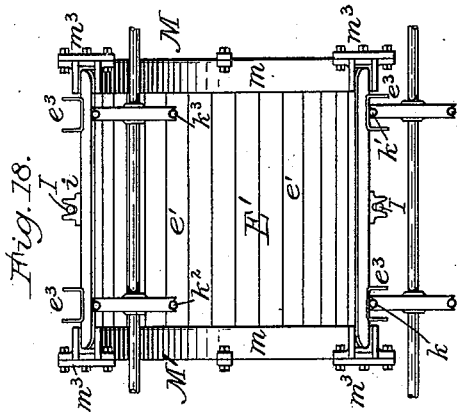
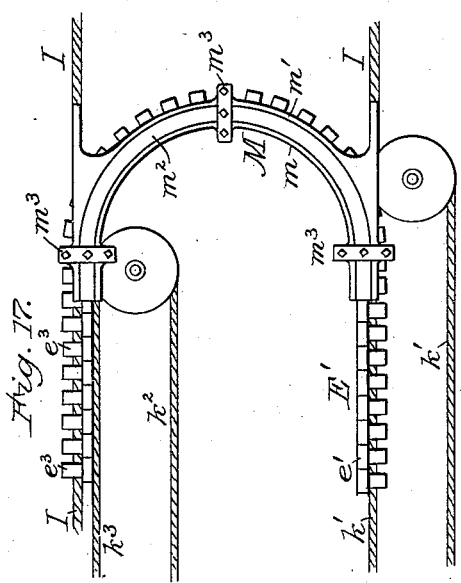
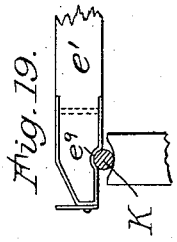

(No Model.) 7 Sheets—Sheet 4.
H. C. LOWRIE.
APPARATUS FOR EXCAVATING, REMOVING, AND DEPOSITING EARTHY MATTER.
No. 565,549. Patented Aug. 11, 1896.
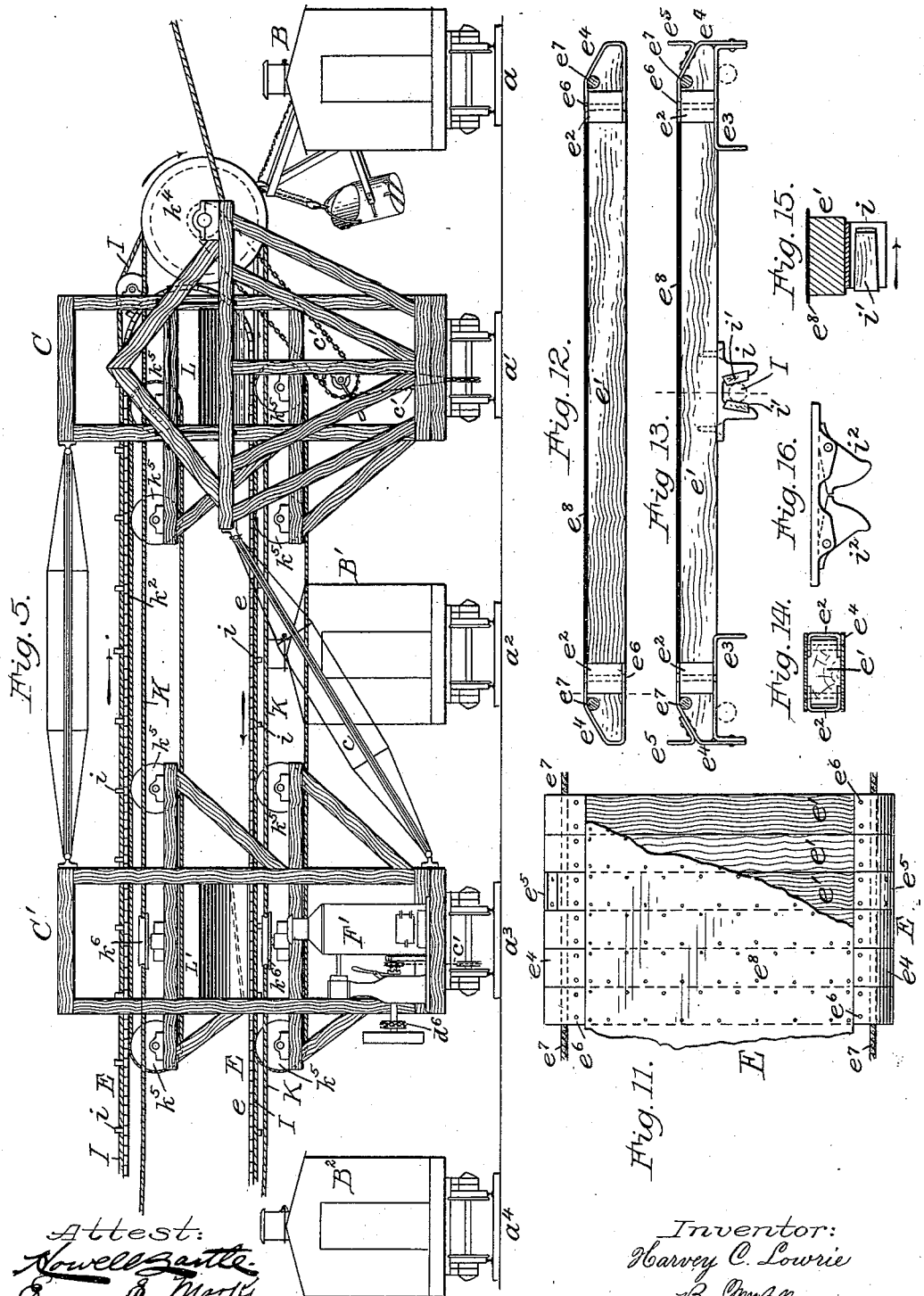
Attest:
Nowell Battle
Emma E. Marks
Inventor:
Harvey C. Lowrie
By Wm C. Mong
Attorney (No Model.)

7 Sheets—Sheet 5.

H. C. LOWRIE.
APPARATUS FOR EXCAVATING, REMOVING, AND DEPOSITING EARTHY MATTER.

No. 565,549.

Patented Aug. 11, 1896.

Attest:
Nowell Bartle
Emma E. Morris

Inventor:
Harvey C. Lowrie
By
Attorney (No Model.) 7 Sheets—Sheet 6.
H. C. LOWRIE.
APPARATUS FOR EXCAVATING, REMOVING, AND DEPOSITING EARTHY MATTER.
No. 565,549. Patented Aug. 11, 1896.
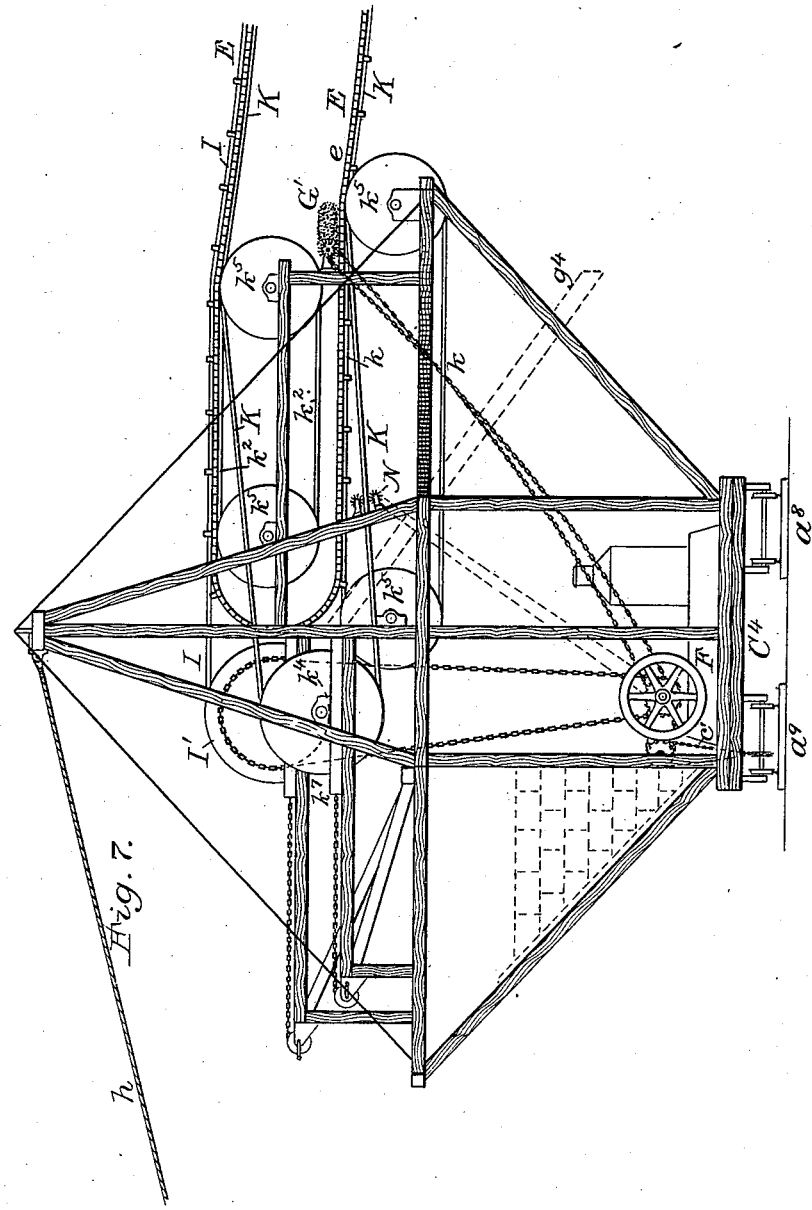
Attest:
Howell Bartle
Emma E. Morks
Inventor:
Harvey C. Lowrie
By Wm C Ward
Attorney (No Model.)  7 Sheets—Sheet 7.
H. C. LOWRIE.
APPARATUS FOR EXCAVATING, REMOVING, AND DEPOSITING EARTHY MATTER.
No. 565,549.  Patented Aug. 11, 1896.
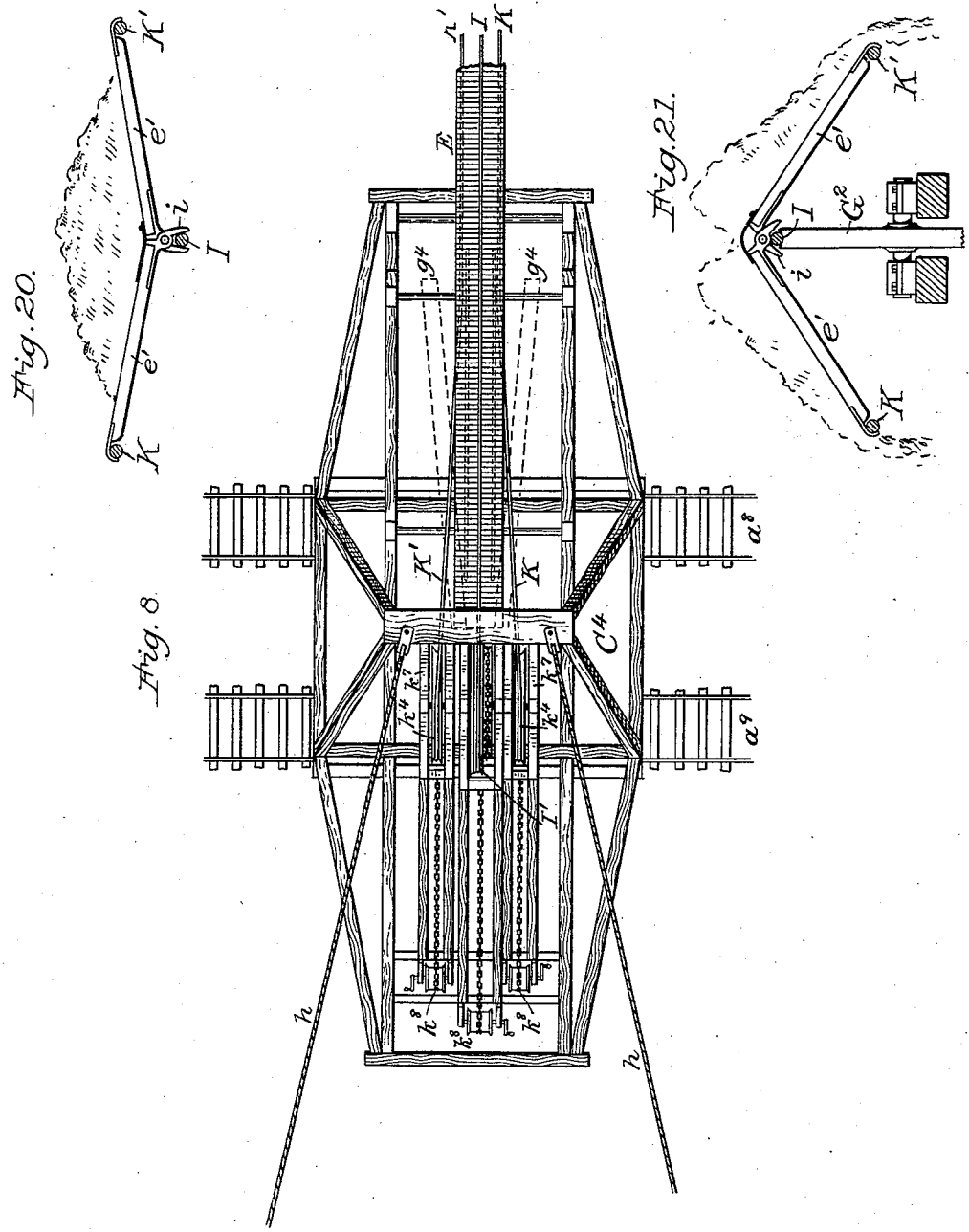
Attest:
Howell Bartle
Emma E. Morris
Inventor
Harvey C. Lowrie
By [signature]
Attorney
THE NORRIS PETERS CO., PHOTO-LITHO., WASHINGTON, D. C.

UNITED STATES PATENT OFFICE.

HARVEY C. LOWRIE, OF DENVER, COLORADO.

APPARATUS FOR EXCAVATING, REMOVING, AND DEPOSITING EARTHY MATTER.

SPECIFICATION forming part of Letters Patent No. 565,549, dated August 11, 1896.

Application filed March 27, 1894. Serial No. 505,281. (No model.)

*To all whom it may concern:*

Be it known that I, HARVEY C. LOWRIE, of Denver, in the county of Arapahoe and State of Colorado, have invented certain new and useful improvements in apparatus for excavating, removing, and depositing earthy matter, on a large scale, as, for instance, in the construction of canals, irrigation ditches, &c.; and I do hereby declare that the following specification, taken in connection with the drawings furnished and forming a part of the same, is a clear, true, and complete description of my invention.

It is generally conceded that the most satisfactory excavating service can be secured by the use of that class of car-mounted steam-shovels which embody a swinging crane, from which a single shovel or scoop is suspended and operated, and certain features of my invention include such a grouping of steam-shovels on parallel tracks with and at each side of the initial element of the spoil-removing portion of the apparatus, as will enable a practically continuous operation, and I have so devised and arranged the removing and depositing portion of the apparatus that it may be constructed at reasonable cost, be reliable and capable of being practically continuous in its operation and economical in matter of attendance, involve the expenditure of only a reasonable amount of power, and which will entail only a moderate cost for maintenance and repairs.

The spoil removing or conveying portion of the apparatus includes as a novel feature an endless conveyer or traveling platform, supported on endless wire ropes or cables, and carried by and suspended between car-mounted trestles, which are provided with a series of parallel railway-tracks, said platform being adapted to continuous operation and organized with one or more intermediate endless elevating carriers or loaders adjacent to the steam-shovel, so that notwithstanding the intermitting action of the several coöperating steam-shovels the loading of the traveling platform may be practically uniform and continuous, the apparatus as a whole being such that the several car-mounted shovels may be readily kept up to the line of the working breast or heading of a cut, and so that the entire conveying portion of the apparatus may be advanced from time to time into coöperative relations with all of the shovels, and made to convey the spoil and discharge it at any proper point at the desired side of the excavated cut.

My apparatus is intended to obviate the many difficulties and objections incident to apparatus wherein the spoil conveying and dumping is performed by means of tracks and railway-cars, however these may be arranged and operated, and in the use of which much manual labor, considerable loss in time, and heavy cost in maintenance and repairs are inevitably involved.

My said apparatus embodies many features believed to be new, not only in the matter of organizing the several main parts thereof, but also in matters of detail in construction and combination, all of which, after a full description thereof and their modes of operation, will be duly specified in the several clauses of claim hereunto annexed.

Referring to the drawings, Figures 1 and 2 illustrate on a small scale, in connection with an excavated cut, shown in lateral section, an apparatus constructed and organized in accordance with my invention, and shown in rear elevation, it being understood that Fig. 2 is an extension of Fig. 1, at the left-hand end thereof. Fig. 3 is a top or plan view of the apparatus Figs. 1 and 2 and the ground covered thereby. Fig. 4 is a side elevation of one of the loaders with its hopper in section and a similar elevation of one of the car-mounted trestles. Fig. 5 is a rear elevation of the entire portion of the apparatus, which occupies the cut. Fig. 6 is a top or plan view of the "loaders," the main traveling platform, and the car-mounted trestles which occupy the cut. Figs. 7 and 8 illustrate the outer terminal trestle respectively in rear elevation and plan. Figs. 9 and 10 illustrate a portion of the traveling-platform and the dumping-plow in side and top view. Figs. 11 to 15 illustrate the construction of the traveling platform in detail. Fig. 16 illustrates an automatic clamp for coupling the slats of the traveling-platform to the driving-cable. Figs. 17 and 18 illustrate a variation in the construction of the traveling platform wherein the slats are disconnected from each other. Fig. 19 illustrates a variation in the mode of securing proper relations between the platform-slats and the carrying-cables. Figs. 20 and 21 illustrate a modification in the construction of the platform and respectively show the latter in its carrying and its dumping position.

I will first describe the apparatus as a whole, and indicate its mode of operation in connection with Figs. 1, 2, and 3, and thereafter I will describe such details in the construction of the several parts as may be deemed necessary in connection with the other figures of the drawings.

In said Figs. 1 and 3 the excavated cut or canal at A is shown to be of such a width that the entire finishing or final excavation can be performed by advancing the apparatus in one direction, all of the spoil being conveyed to the one side of the cut and deposited at A'. It will, however, be understood that the depth as indicated would only be attained by first making a cut of, say, half the depth of that shown, and that during that initial operation the apparatus would have been advanced in the opposite direction and with the conveying portion of the apparatus shifted in position and extending to the side of the cut opposite to that indicated in these figures. It will also be understood that in excavating a length of specially wide canals, for instance, the apparatus would or might require shifting six or eight or even more times, and made to operate alternately up and down each side of the cut an appropriate number of times.

It being essential that the entire apparatus should be readily advanced, it is as a whole car mounted, or, in other words provided with wheels requiring appropriate parallel railway-tracks, which must vary as to number and arrangement according to the size of the plant.

As here shown, there are five parallel railway-tracks in the cut A, as at $a$, $a'$, $a^2$, $a^3$, and $a^4$, these being extended as the work progresses and taken up at the rear, as may be required. Of these five tracks, the two outer and the central tracks are occupied by car-mounted steam-shovels B, B', and B$^2$, while the intervening tracks, $a^3$ and $a'$, are occupied by car-mounted trestles C and C' and endless conveying-elevators D and D'. At one side of the cut on the berm there are five other parallel railway-tracks, one at $a^5$, a pair of tracks at $a^6$ and $a^7$, and still another pair at $a^8$ and $a^9$, these five tracks being occupied by three car-mounted trestles C$^2$, C$^3$, and C$^4$.

Between the terminal trestles C and C$^4$ there is an endless traveling platform or conveyer E, supported by and suspended from said trestles, and others intermediate and adapted to be continuously driven by means of a steam-engine F on the base of the outlying terminal trestle C$^4$. The endless elevating-conveyers D D' are the platform-loaders, and are adapted to be driven, as by means of the platform-engine and by a steam-engine F' on the base of the trestles C', and the steam-shovels B, B', and B$^2$ have, as usual, their own steam-engines. As here shown, the lower portion $e$ of the endless platform E affords the outgoing or load-carrying surface, the spoil thereon being indicated by dotted lines in Figs. 1 and 2, the platform-loaders D D' receiving from the steam-shovels and delivering the spoil between the outgoing and incoming portions of the traveling platform at the trestles C and C'.

A discharging scoop or plow at G is borne on the load-carrying surface of the platform between the two outermost trestles C$^4$ and C$^3$, and is adjustably maintained in position by a chain or line $g$ and a windlass $g'$ on the trestle C$^3$. All of the trestles should be well ballasted, and the two terminal trestles should be suitably guyed, as by wire ropes $h$, secured, preferably, to trundling-anchors, one of which is shown at H in the form of a tight cylinder, properly loaded with water, for instance, and provided with peripheral flanges, as at $h$, for securing a firm engagement with the ground and yet capable of being quite readily trundled or rolled upon suitable skids, as at $h^2$, during the progressive movement of the several trestles.

Without here considering details in the construction of the several parts of the apparatus thus far referred to, it is to be understood that the organization described embodies the main feature of my invention—viz., the indicated combination of a series of parallel railway-tracks, one or more car-mounted steam-shovels, one or more endless traveling elevating-conveyers, an endless traveling platform, a series of car-mounted trestles, and means for properly driving the conveyers and platform. It will be readily seen that with this organization the several steam-shovels may each operate in digging at its own portion of the breast in the cut, and that each of the two outer shovels can deliver to the adjacent elevating-conveyer, while the middle shovel can deliver to either or both of said elevating-conveyers, the spaces between the tracks being proportioned to the length of the sweep in which the shovels may be worked. This arrangement assures practically continuous conveying operations, even should either of the shovels or either of the loaders become temporarily disabled. Either shovel may, if disabled, be retired on its track and another substituted, or, if another is not available, then either of those in service may be returned on its own track and switched over to the vacated track, and by thus alternating position carry forward the work in an effective manner until the return of the disabled shovel. As the work progresses the several trestles will be readily advanced correspondingly on their tracks. The discharge of the spoil from the platform may be accomplished at any desired point between any two outlying trestles. The suspended traveling platform, although capable of carrying all requisite load, is comparatively light, inexpensive, easily operated with comparatively little power and at a speed which will enable it to receive and convey spoil as fast as it can be excavated by three or even more shovels without unduly loading the platform at any one point. It will be obvious that in proportion to the capacity of the plant the working force required for attendance would be quite small while the apparatus is working normally, i. e., the usual gangs for steam-shovels, skilled mechanics and laborers for engine tending, repairs, track-laying, and attendance at loading and discharging points, all involving a much smaller force than is required in operating plants of like capacity embracing steam-shovels, long railways, and many dump-cars, however operated, and I wholly obviate the loss of time incident to shifting cars at the shovels.

The steam-shovels B, B', and $B^2$, being of the usual type, require no detailed description, but it will be understood that a fourth car-mounted steam-shovel may well be held in reserve to take the place of a disabled shovel, the several tracks being usually connected by temporary switch-tracks at the rear to provide for such changes.

The car-mounted loaders D and D' are practically counterparts, and are specially illustrated in Figs. 4 and 6.

The endless apron or conveyer $d$ is inclined and has at its foot a hopper $d'$, into which the steam-shovels deliver the spoil, the bottom $d^2$ of the hopper being so arranged that a mass of spoil may be retained thereon, upon which new deliveries will be made, and the endless belt-conveyer $d$ will be practically relieved from injury from heavy masses when the shovels are discharged. However full the hopper may be, the traveling apron will carry but little more spoil than will be retained thereon by its several cross-cleats $d^3$. Adjacent to the foot the apron is supported on lateral antifriction-rollers at $d^4$, which enable it to withstand the overlying weight of spoil in the hopper. Beneath the endless apron there is a trough curved upwardly at the lower end for receiving the droppings from the inverted apron, all of which will be from time to time carried upward by the cleats $d^3$. Power may be applied to the belt $d$ in any desired manner, but is here shown to be by way of a power-shaft $d^5$, which is coupled by a central sprocket-wheel thereon to a sprocket-chain connected to and traveling with the apron, all in a manner well known.

The power-shaft $d^5$ of one loader D', as shown in Fig. 4, is driven by way of a sprocket-chain $d^6$ from an engine F' on the car of the trestle C', but the other loaders D are coupled by a similar chain and gearing at $d^7$ with a continuously-driven sheave-shaft on the trestle C, as shown in Fig. 6, so as to be operated by the engine F on the outer trestle $C^4$. In the case of disablement either loader may be uncoupled from its trestle and bodily transferred, as by jacks, rollers, and cross-rails, to either adjacent railway-track for removal and another put in by the same means.

The trestles $C^2$ and $C^3$ require no special description, although they differ as to dimensions and as to the number of sheaves thereon. Both are car-mounted and well ballasted, but the former has one railway-track and the other two tracks. Either trestle might be used in the place of the other, but I prefer that the trestle nearest the cut A should have only two sets of sheaves, one above the other, for respectively supporting the outgoing and incoming portions of the traveling platform. The trestle $C^3$ should, however, have a specially broad base and two railway tracks, because of its being adjacent to the outer terminal trestle $C^4$, and also because it bears the strain of the dumping-plow G by way of the lines $g$.

The car-mounted trestles C and C' are so coupled together that they coöperate as one terminal trestle, the truss-brace $c$ being readily detachable, so as to offer no obstruction to the central track $a^2$, should it be necessary to retire the central steam-shovel, as for repairs, and the substitution of another. The other terminal trestle $C^4$, as shown in Figs. 7 and 8, is well ballasted on its two tracks. All of these trestles could be quite readily moved on their tracks by the use of hand-levers, but I provide for moving them by power by coupling an axle of some of the trestles to adjacent sheave-shafts, as indicated in Fig. 5, by sprocket-chain $c'$, controlled by suitable clutches, and on the trestles C' and $C^4$ similar sprocket connections at $c'$ are connected with the steam-engines thereon.

The traveling platform E may be widely varied in the matter of its construction and mode of operation without departure from that portion of my invention which includes the organization of any suitable traveling platform, mountrd on and suspended between car-mounted trestles, and with coöperating steam shovels and loaders, as described. I have, however, devised an endless traveling conveyer or platform, and so organized it with supporting and driving mechanism that the platform is not subjected to tensile strains, and hence I have eliminated one of the principal destructive factors encountered in the operation of endless-belt conveyers as heretofore organized. I have also avoided the use of such rigid parallel supporting-frames as have heretofore been used beneath endless conveyers, as well as the numerous antifriction-rollers carried by such frames, all of which involve great cost in construction and maintenance.

My conveying-platform may be composed of suitable boards or planks in even lengths and placed edge to edge without being connected to each other, or they may be connected either throughout the length of the platform, as is necessary in the best form of my apparatus, or connected in separable sections. These planks or slats may in many cases afford the load-carrying surface of the platform, but it is sometimes important that the carrying surface be afforded by some suitable sheeted fabric, as, for instance, heavy canvas, with or without a filling therein, after the manner of rubber belting. When such a fabric is employed, its durability will be at its maximum, because it will not be subjected to tensile supporting strains and the wearing action will be limited to abrasion by the spoil carried thereon, and with proper loading and dumping appliances, as employed by me, abrasion will be reduced to a minimum.

The platform E, as illustrated in Figs. 11 to 14, is composed mainly of wooden slats or strips $e'$, of two-inch plank, usually about five feet long and six inches wide. At each end each strip is provided at its two edges with iron clips $e^2$, which project slightly beyond the edge of the strip, thus affording metallic contacts or abutments between the strips. At each end of some of the strips there is on the under side a piece of iron bent to form a pair of guiding-lugs, as at $e^3$, Fig. 13. Both ends of each slat have an iron shoe, as at $e^4$, this varying in its form, as shown in Figs. 12 and 13.

In Fig. 12 the shoe $e^4$ embraces the end of the strip, but in Fig. 13 said shoe $e^4$ is bolted at its outer end to the outer guide-lug $e^3$, and a similar but oppositely-projecting guiding-lug $e^5$ is secured to an upper portion of the shoe. These shoes are secured to a slat by means of vertical bolts or screws $e^6$ in such a manner that said shoes also serve as clamps for uniting the slats to binding-ropes or small wire cables $e^7$, which are partially housed in transverse slots in the slats, as clearly indicated. These binding-ropes serve merely as flexible connections between the several strips or slats, and they extend continuously throughout the platform. The load-conveying surface of this platform is composed of sheeted fabric, as at $e^8$, which may be nailed lightly to each wooden strip or only nailed at intervals thereto; or, if desired, the clamping-shoes may be relied upon for properly controlling the covering fabric by overlapping its edges. At intervals certain of the slats $e'$ are centrally provided at the rear side with a pair of transverse clamping-jaws, which may be widely varied in their form and mode of operation, so long as they will serve as means for operatively coupling the platform to a driving-cable. In Figs. 13 and 15 the cable-clamping jaw $i$ consists of a forked casting bolted to the strip or slat, the inner surface of the fork being inclined, so that a cable, as indicated in dotted lines at I in Fig. 13, can freely wedge itself therein. For securing good frictional contact with minimum abrasive action on the driving-cable I prefer that the fork be mortised at its sides for receiving wedge-shaped blocks of wood $i'$, as clearly indicated in Figs. 13 and 15, their arrangement being such that the cable will wedge itself into contact with the blocks and the carrying strain be applied thereto in a direction toward the small ends of the blocks, as indicated by the arrow in Fig. 15.

In Fig. 16 another form of cable-clamp is shown, in which the jaws $i^2$ $i^2$ are so pivoted with relation to their contact-faces that tightening (i. e., upward) strain on the cable will cause the jaws to tightly grasp it and to freely release it under light separating strains, either by lifting the slat and clamp above the driving-cable or by depressing the cable.

As the platform is organized by me with carrying-cables, the slats $e'$ are supported thereby not only during the outgoing or load-carrying movement of the platform, but also during the return movement, and this involves the use of a pair of main cables K K', which carry and support the platform proper at all points between the terminal trestles— i. e., during both its outgoing and its return movements the platform proper overlies the main carrying-cables, as shown in Figs. 5 and 7, and hence said cables must be longer than the platform, and at the two terminal trestles C C' and C$^4$ said cables must be relieved from supporting duty and separated for permitting the platform to pass vertically between them. At each of the two terminal trestles there are two pairs of short auxiliary endless carrying-cables, of which one pair, at $k$ $k'$, are below the lower or load-carrying portion $e$ of the platform, and the other pair, at $k^2$ $k^3$, are below the returning or upper portion, as clearly indicated in Figs. 4, 5, and 7.

The main carrying-cables K K' turn on pairs of terminal vertical sheaves, as at $k^4$, and the auxiliary cables are each provided with appropriate sheaves, each of which is designated $k^5$. The sheaves $k^4$ of each pair are separated by a space somewhat wider than the width of the platform E, thus providing for a divergence of the cables K K', commencing near the inner ends of the auxiliary cables, as shown in Figs. 4, 5, and 6, and at said points of divergence there are lateral controlling-sheaves $k^6$ on the terminal trestle C', but on the outer terminal trestle C$^4$ the outer sheaves $k^5$ of the auxiliary carrying-cables have specially deep grooves or at least wide outer flanges, which serve as lateral abutments for the control of the main carrying-cables at their points of divergence, as clearly indicated in Figs. 7 and 8.

In passing from the main carrying-cables to the auxiliary carrying-cables the upper portion of the platform proper is lifted, because, as shown in Fig. 5, the upper auxiliary cables occupy a plane sufficiently above the plane of the main cables to lift and free the platform therefrom, and when the platform passes downwardly to the lower or carrying level it is supported upon the lower auxiliary cables until after it passes them at the side of the trestle C'. At the terminal trestle C$^4$ there is no such lifting effect, but the same result is accomplished, because the pair of sheaves $k^4$ are so located with reference to the two outer pairs of sheaves $k^5$ that the diverging portion of the main carrying-cables K and K' incline downwardly, as shown in Fig. 7, and away from the longitudinal plane occupied by the upper portions of the auxiliary cables $k$ and $k^2$. At this trestle $C^4$ the sheaves $k^4$ are mounted on sliding frames $k^7$, provided with suitable winches and chains, as indicated at $k^8$, for tightening the carrying-cables K K'. The sheaves $k^4$ at the terminal trestle C are loosely mounted on their shaft $l$.

It will be understood from Fig. 14 that the main carrying-cables K K' occupy positions between the appropriate pairs of guiding-lugs $e^3$ on the slats during the outgoing or carrying service, and that during the return movement the platform or belt, then being bottom up and resting on said cables, is prevented from undue lateral displacement by the small guide-lugs $e^5$.

Power might be applied to the main carrying-cables without departure from certain portions of my invention, but as here shown a driving-cable I is employed, the power being applied thereto from the engine F on the terminal trestle $C^4$, by means of a sprocket chain and wheel to the sheaves I', as in Figs. 7 and 8, said sheave being mounted in a sliding frame and provided with a tightening-winch. At the terminal trestle C, Figs. 5 and 6, the driving-cable passes over a sheave $I^2$, which is tight on its shaft $l$. The line of the driving-cable is centrally located with relation to the platform E throughout its length, being beneath its lower or load-carrying portion and above its upper or returning portion, as before indicated, the driving-cable specially engages frictionally with the jaws $i$ beneath the load-carrying portion of the platform, and by resting upon the upper or returning portion thereof and in the then inverted clamping-jaws $i$ said cable is enabled to drive the platform in both directions, the main carrying-cables moving freely with the platform, although they and the platform are connected only by gravity and frictional contact. The carrying-cables being practically independent of each other, and the platform merely resting upon and, by frictional contact, imparting motion to both, it will be obvious that the platform and the carrying-cables will maintain their proper relations, and that the driving-cable can only exercise a thrusting action upon the platform, extending from the terminal trestle C, at which point it is engaged by each downwardly-arriving clamping-jaw $i$ and continuing onward. At the terminal trestle $C^4$, the upper portion of the driving-cable I promptly enters and engages with the inverted jaws $i$ as soon as they reach the upper plane, and there is no tendency for disengagement throughout the entire path of the platform.

The plow G, as shown in Figs. 9 and 10, is provided with supporting-rollers $g^2$, which prevent the plow from scraping too heavily upon the surface of the platform, and pendent side rollers $g^3$, by engagement with the edges of the platform, serve to prevent the plow from undue sidewise deflection. At the outer terminal trestle $C^4$ there is a platform-brush at G', Fig. 7, but at the point where the platform curves upwardly some earthy matter will accumulate, and this will be continuously discharged from the edges of the platform, where it will be received by inclined chutes, as at $g^4$, and delivered at the side of the trestle beyond the spoil-bank A'.

Referring now to Figs. 4, 5, and 6, it will be seen that the loaders D and D' deliver spoil from their upper ends into the hoppers L and L', respectively mounted in the trestles C and C' above the outgoing or lower portion of the platform E. These hoppers have laterally and longitudinally inclined sides, which provide for a gradual and easy delivery of spoil to the platform in the direction of its movement at two points, the spoil which is delivered from the loader D' overlying the mass delivered from the loader D.

The endless platform E, embodying slats flexibly connected by the wire ropes or cables $e^7$, has been shown to be wholly free from tensile strains, but it is to be understood that certain portions of my invention would be involved if the platform should be organized as mainly described, but so that only its load-carrying portion should be free from tensile strain. In other words, it will involve no departure from certain features of my invention if the unloaded or returning portion of the platform be made to bear its own weight between the points of suspension at the several trestles, in which case the carrying-cables would not underlie the upper portion of the platform, and therefore the platform-slat-connecting cables $e^7$ should be stronger than is necessary when they serve as mere flexible connections.

While the best results will be secured by carrying the spoil upon the lower portion of the endless platform, I do not restrict certain features of my invention to that arrangement, it being obvious that the upper portion of the platform will perform good carrying service.

Referring to the trundling-anchor H, Fig. 2, it will be understood that a similar anchor may be used at the other terminal trestle, and that such anchors may be variously constructed—as, for instance, at the terminal trestle C, a heavily-weighted car on the track $a'$ may serve a good purpose by being guyed to the trestle C', and also serving as a base for inclined struts or extending downward from the trestle C, and such heavy ballasted cars serving as trundling-anchors would be often preferable to the cylindrical trundling-anchor shown.

It will be obvious that in some cases the platform-slats may be composed of sheet iron or steel stiffened by flanges bent downward on the edges, and that whether the platform-slats be flexibly connected or not, the main carrying-cables, the auxiliary cables, and the driving-cable constitute an operative organization for supporting and operating the platform.

For illustrating the control, by the driving-cable, of the main and auxiliary carrying-cables and a traveling platform, the slats of which are not continuously connected, I will refer to Figs. 17 and 18. In this instance the main carrying-cables are employed as before described, but are not here shown. The auxiliary carrying-cables $k$ $k'$, and $k^2$ $k^3$ are as before described. The traveling platform E' has no fabric surface, and the slats $e'$ are wholly disconnected from each other, but are provided with end shoes, and each has pendent lugs $e^3$, but these are located farther from the ends than in the platform first described, and the projecting end lugs $e^5$ on the slats first described may or may not be employed. The driving-cable I and the cable-clamping jaws $i$ are all as before described. The slats $e'$ being disconnected, they must be pushed upwardly at the outer terminal trestle and dropped at the inner terminal trestle and at both points their consecutive relations are maintained by a pair of curved guideways M M', each consisting in part of inner and outer curved plates $m$ $m'$, separated by space a little greater than the thickness of the slats. Segmental plates $m^2$, secured to the curved plates by bracket $m^3$, serve as end guides for the slats while passing from either plane to the other.

It will be seen that the wire ropes which connect the slats, as previously described, perform their prime functions at the two points of passage from one plane to another in maintaining continuity, and that the guideways M M' perform the same duty, the slats in both cases depending for their movement upon the thrusting action of the driving-cable.

The projecting lugs $e^3$ need not be employed on the slats $e'$ if the latter at a proper distance from their ends be provided with lateral grooves, as illustrated in Fig. 19 at $e^9$, to afford slats for engagement with the carrying-cables K K'.

The dumping of spoil from a platform may be accomplished without a scraper or plow if the platform be constructed as illustrated in Figs. 20 and 21. In this instance the slats $e'$ are in two pieces, rule-jointed in the middle, and provided with jaws, as at $i$, which engage with the driving-cable I. As shown in Fig. 20, the center of the platform is slightly depressed when carrying its load, the carrying-cables K K' operating as before described, and the hinge-joints of the slats, as well as the driving-cable, preventing undue central depression.

At any desired dumping point upon a trestle or other suitable support one or more dumping-sheaves $G^2$ are located beneath the central line of the platform at such a height above the normal plane of the carrying-cables that the driving-cable and the central portion of the platform will be lifted and the load dumped from the sides, as shown in Fig. 21, the two carrying-cables being then swung or drawn toward each other because of the hold maintained thereon by the hooked ends of the slats.

As a rule it will be desirable to keep the carrying-cables and the driving-cable free from accretions of earthy matter, and for that purpose suitable scrapers or revolving brushes, as at N, Fig. 7, will be employed.

I have hereinbefore referred to the working of the apparatus first in one direction and then back again with the endless platform projected on the opposite side of the cut, and it will be understood that such changes of adjustment involve the disconnection of the trestles C and C', an exchange of position, and their reversal end for end. The other trestles may be more or less dismantled and moved on temporary tracks to the cut and across it upon temporary bridging-trestles or, preferably, upon unexcavated heads of the cut, which should be left for that purpose at the ends of each working section.

Having thus described my invention, I claim as new and desire to secure by Letters Patent—

1. In an organization for excavating ditches, canals &c., the combination substantially as hereinbefore described, of a series of parallel railway-tracks; car-mounted steam-shovels, each on its own track; one or more car-mounted endless-belt elevating-conveyers, or loaders each receiving spoil from one or more of said shovels, and operating in line with the track; an endless traveling conveying-platform, at right angles to the elevating-conveyers, and receiving its load therefrom; a series of car-mounted trestles, each on an appropriate track for supporting the platform in a plane above the shovels, and means for continuously driving said conveyers and platform, the organization being such, that the steam-shovels may be independently advanced in service and wholly retired for repairs, and the remainder of the apparatus, as a whole, advanced from time to time, for maintaining coöperative relations with the steam-shovels in service.

2. In an endless conveyer or traveling platform, the combination of a series of transverse slats, longitudinal rope or cable housed in said slats, and metal shoes at the ends of the slats which protect the ends thereof and also clamp the slats to the rope substantially as described.

3. In an endless conveyer or traveling platform, the combination of a series of transverse slats, longitudinal rope or cable uniting the slats, and a series of guide-lugs for maintaining the platform in proper relation to underlying supporting-cables.

4. The combination substantially as hereinbefore described of an endless traveling platform; a pair of endless cables which mainly support and travel with the platform; a trestle which supports said cables and platform, at one terminus thereof, and auxiliary cables, on said trestle, which relieve the main cables from supporting duty, at and adjacent to the vertical portions of the platform.

5. In an endless traveling platform the combination, substantially as hereinbefore described, of a pair of endless main carrying-cables, arranged side by side on vertical sheaves; an endless driving-cable between said carrying-cables two pairs of auxiliary carrying-cables adjacent to each terminal of the main carrying-cables; a series of platform-slats resting upon the carrying-cables; jaws on said slats for engagement with the driving-cable, and means for maintaining the consecutive relation of the slats in their passage from one plane to another, the organization being such, that the driving-cable will engage with the slats, impart to them traveling movement, cause all of the carrying-cables to move with the slats, and also cause the slats at the terminal of the platform, to pass vertically between the main carrying-cables.

6. The combination substantially as hereinbefore described, of an endless traveling platform; car-mounted trestles from which said platform is suspended, and a trundling-anchor guyed to the terminal trestle, whereby said trestle and its anchor may be simultaneously moved, while maintaining effective straining tension on the guy.

7. The combination with the terminal or load-receiving portion of an endless traveling platform, of heavily-weighted car-mounted trestles which support the platform, are car-mounted on parallel railway-tracks, and are laterally guyed and braced with reference to each other, substantially as described, for enabling them to coöperate with each other in resistance of the lateral strain thereon which is incident to the strain in line with the traveling platform.

HARVEY C. LOWRIE.

Witnesses:
HOWELL BARTLE,
THAD H. LIBBEY.